United States Patent [19]

Kubo et al.

[11] Patent Number: 4,764,819
[45] Date of Patent: Aug. 16, 1988

[54] METHOD AND APPARATUS FOR HELICAL SCAN TYPE MAGNETIC RECORDING AND REPRODUCING WITH A ROTARY MAGNETIC HEAD

[75] Inventors: Kanji Kubo; Yoshiaki Doyama, both of Hirakata, Japan

[73] Assignee: Matsushita Electric Industrial Co., Ltd., Osaka, Japan

[21] Appl. No.: 885,661

[22] Filed: Jul. 15, 1986

[30] Foreign Application Priority Data

Jul. 18, 1985 [JP] Japan .................. 60-158996
Aug. 2, 1985 [JP] Japan .................. 60-171551
Aug. 7, 1985 [JP] Japan .................. 60-173630

[51] Int. Cl.⁴ ................... G11B 15/467; G11B 5/45
[52] U.S. Cl. ........................ 360/10.2; 360/10.3; 360/77; 360/78
[58] Field of Search ............ 360/10.2, 10.3, 77, 360/78

[56] References Cited

U.S. PATENT DOCUMENTS 4,604,656 8/1986 Fujii ........................ 360/10.3
4,644,414 2/1987 Tamada et al. ............ 360/10.2

FOREIGN PATENT DOCUMENTS 0181942 5/1986 European Pat. Off. .......... 360/77
61-74128 4/1986 Japan .

Primary Examiner—Aristotelis M. Psitos
Attorney, Agent, or Firm—Spencer & Frank

[57] ABSTRACT

A VTR of helical scan type includes a rotary magnetic head fixed on an electro-mechanical converter made of a piezoelectric element and adapted to be displaced along the width of a recording track. In this type of VTR, the rotary head can follow the curving of the recording track, and therefore a superior reproduction output is always produced. Also, a noiseless reproduction image is provided at the time of special reproduction with a tape feed rate different from the recording speed. When the electro-mechanical converter is driven, the average DC component of the drive voltage is desirably reduced to zero to secure a dynamic range effectively. Especially this consideration is necessary to maintain the service life of the piezoelectric element which may make up the electro-mechanical converter. The average DC component of the drive voltage of the electro-mechanical converter is reduced to zero, or specifically, a weighted average of the drive voltage for head scanning is produced, and the drive voltage is appropriately processed during the period when the head is not in contact with the tape.

12 Claims, 19 Drawing Sheets

FIG. 1
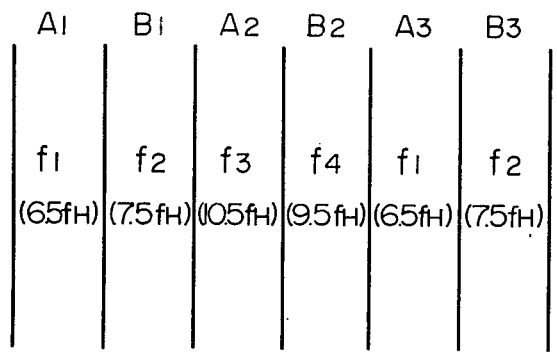
FIG. 2
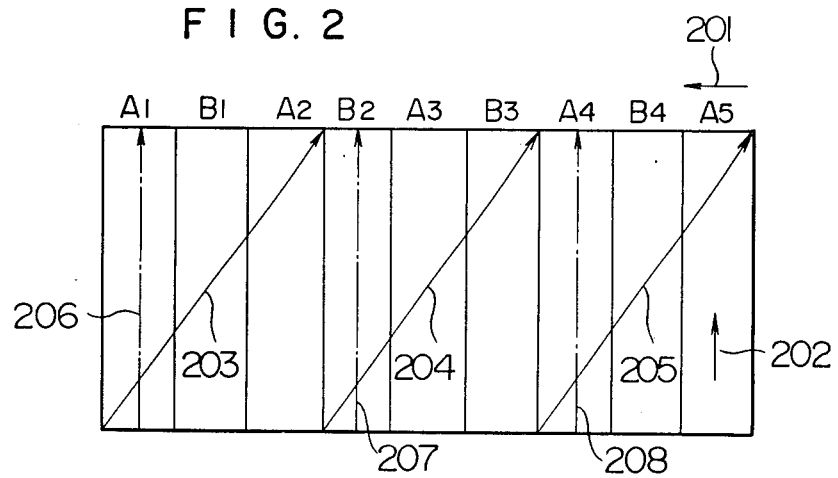
FIG. 3
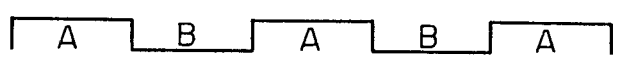
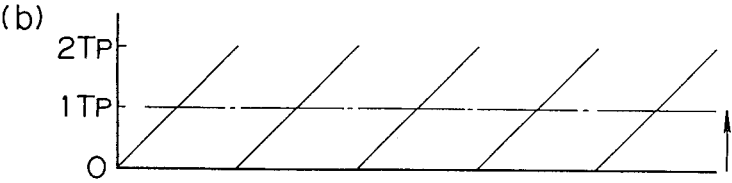

FIG. 4
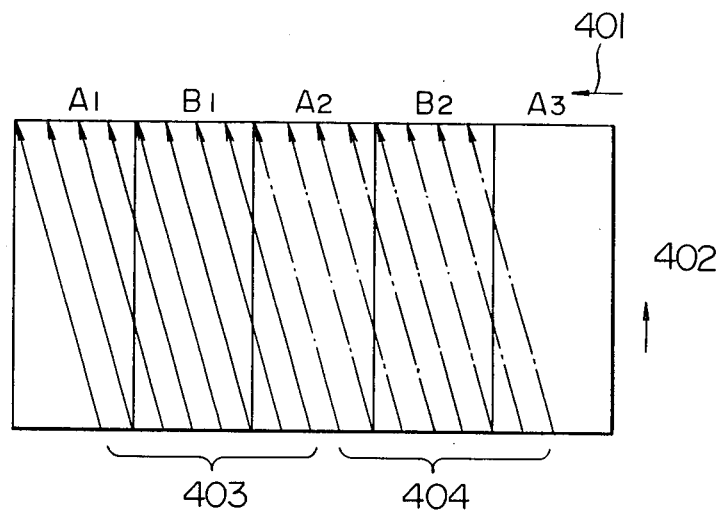
FIG. 5
(a) 
(b) 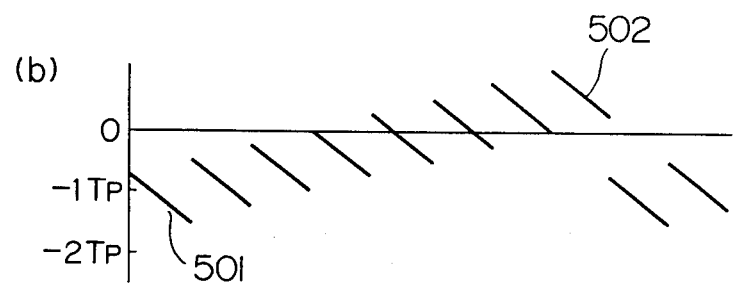

F I G. 6
(a) 
(b) 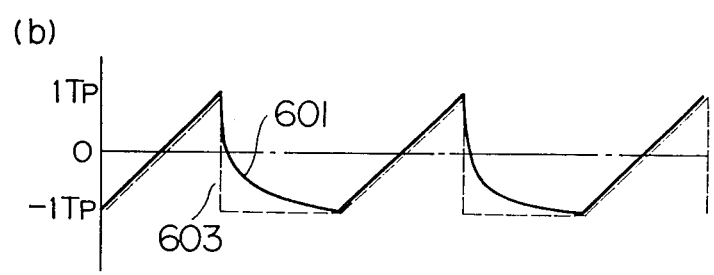
(c) 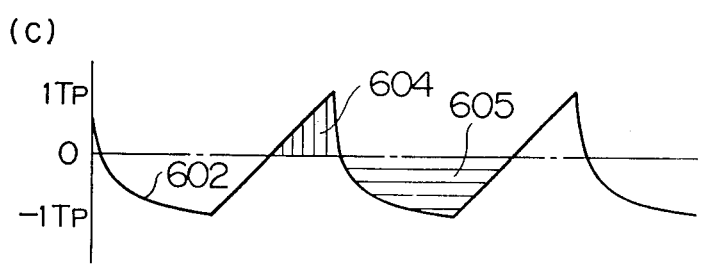

F I G. 13
(a) 
(b) 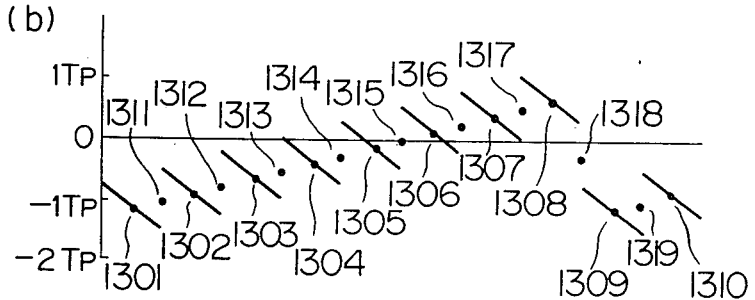
F I G. 14
(a) 
(b) 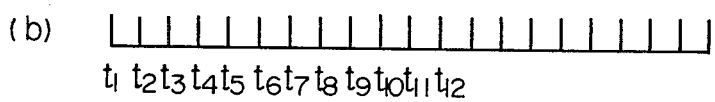
(c) 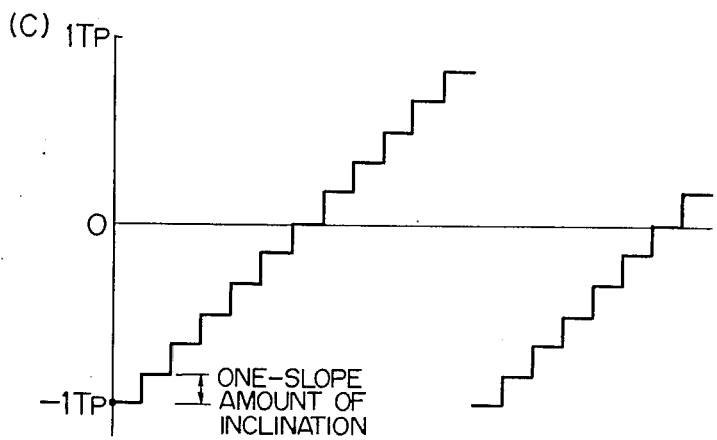

FIG. 18
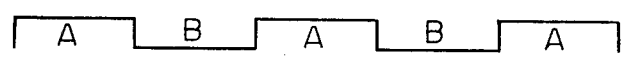
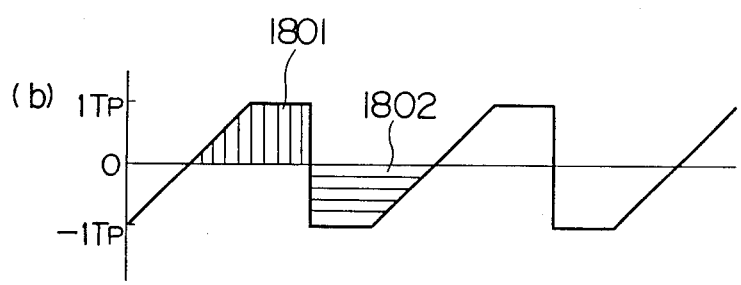
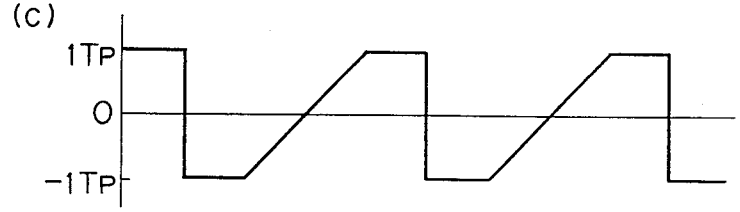

METHOD AND APPARATUS FOR HELICAL SCAN TYPE MAGNETIC RECORDING AND REPRODUCING WITH A ROTARY MAGNETIC HEAD

BACKGROUND OF THE INVENTION

1. Field of the Invention

The present invention relates to an apparatus and method for magnetic recording and reproducing (hereinafter referred to as "VTR"), or more in particular to a VTR comprising an electro-mechanical converter element constructed of a piezoelectric element or the like on which a magnetic head is mounted, in which the magnetic head is movable along the rotational axis of a rotary cylinder thereby to obtain a special noiseless reproduced image, and the DC component applied to the electro-mechanical converter element is minimized.

2. Description of the prior art

In a method of tracking control of an "8 mm video" as it is commonly called, four frequency pilot signals are recorded in superposition on a video signal, and at the time of reproduction, a tracking error signal is obtained in accordance with the difference in reproduction level between the pilot signals recorded in the tracks on both sides of the track being scanned, and the feed phase of the magnetic tape is controlled by use of this tracking error signal so that the reproduction head may scan on-track along the recording track.

FIG. 1 shows traces of magnetization for recording pilot signals of four frequencies. In FIG. 1, characters $A_1$, $B_1$, ... designate the magnetization traces recorded by the heads A and B respectively, and $f_1$ to $f_4$ the pilot signals. The frequency of the pilot signals is given as about 6.5 $f_H$ to 10.5$f_H$ if the frequency of a horizontal sync signal is assumed to be $f_H$. The frequency difference of the pilot signals recorded in the trarks between the respective tracks is represented by signals having frequencies of $f_H$ and $3f_H$. As a result, if the pilot signals reproduced and the pilot signals recorded on the main scanning track are subjected to balanced-modulation to produce signals of $f_H$ and $3f_H$, the difference between these signals may be used as a tracking error signal. The method of producing a tracking error signal is well known and therefore will not be described in detail in this specification.

In the system using pilot signals, a tracking error signal is produced over the entire range of the recording track. A rotary magnetic head is mounted on an electro-mechanical converter element including a piezoelectric element or the like displaceably along the direction of rotational axis, that is, along the width of the recording track. In this way, the amount of displacement is controlled by the tracking error signal, thus making possible a control system that can follow any curving of the track.

As a result of making the magnetic head displaceable along the width of the recording track, on the other hand, a reproduced image without noises is obtained at the time of a special reproduction with a tape speed different from that for the recording.

It is, however, difficult to realize a control system for a special reproduction without noises only by feeding back a tracking error signal negatively. At the time of high-speed reproduction, the dynamic range of the control system widens, and therefore the tracking accuracy of a control system with a predetermined gain deteriorates with the increase in the width of the dynamic range. In order to prevent this, the amount of track displacement caused by the difference in tape speed between recording and reproduction is normally applied as a preset voltage to an electro-mechanical converter element, while constituting a control system of closed loop by using a tracking error signal.

FIG. 2 shows a trace of head scanning for triple speed reproduction, and FIG. 3 a preset voltage waveform applied to the electro-mechanical converter element indicated with the track pitch (Tp) as a unit.

In FIG. 2, $A_1$, $B_1$, $A_2$, ... represent traces of magnetization recorded by respective heads A and B. The arrow 201 indicates the direction in which the magnetic tape is fed, and the arrow 202 the scanning direction of the magnetic heads. If the tape is fed for reproduction at a speed three times higher than that for recording, for example, the traces of the magnetic head relative to the recording track are as shown by 203 to 205. If a reproduced image without noises is to be obtained by frame reproduction under this condition, the scanning is required to leave the traces shown by 206 to 208. The magnetic heads mounted on the electro-mechanical converter element are capable of being displaced along the width of the recording track. It is, therefore, possible to realize the scanning traces 206 to 208 if the electro-mechanical converter element is supplied with zero voltage at a point when the magnetic tape beings to be in contact with the tape, and a potential equivalent to 2Tp at a point where a magnetic head begins to leave the tape.

Waveforms of the applied voltages (preset waveforms) are shown in FIG. 3. FIG. 3(a) shows a head switching signal (hereinafter referred to as the "H.SW signal"). The H.SW signal has the same frequency as the speed of the rotary cylinder and in phase with the rotation of the rotary cylinder. In FIG. 3(a), characters A and B designate the period during which the heads A and B are in contact with the magnetic tape respectively. FIG. 3(b) shows a preset voltage waveform applied to the electro-mechanical converter element, as converted into a track pitch. In FIG. 3(b), the displacement in the same direction as the feed of the magnetic tape is shown as a positive displacement. If the preset voltage shown in FIG. 3(b) is applied to the electro-mechanical converter element, the head scanning shown in 206 to 208 of FIG. 2 is realized.

In the case where a piezoelectric element is used as the electro-mechanical converter element, it is desirable to keep the average DC level of the applied voltage at zero. Protracted application of a DC voltage to the piezoelectric element would deteriorate the performance such as sensitivity.

Even for the electro-mechanical converter element including other than a piezoelectric element, it is desirable to keep the average DC level of the applied voltage to zero. In the method where only the displacement in positive direction is used as shown in FIG. 3(b), for instance the dynamic range is considerably reduced as compared with the method in which the displacements in both positive and negative directions are used.

A method for reducing the average DC voltage to zero is disclosed previously in the Japanese Laid-Open Patent Publication No. 61-74128. In this conventional method, the center potential of the preset voltage is sampled out at intervals of j, and the center potential is reduced to zero. This method is effective for the triple-speed reproduction as shown in FIG. 3, but not always so for N-fold speed reproduction. This point will be explained below.

FIG. 4 is a diagram showing the head scanning traces for ¼-fold speed reproduction, and FIG. 5 a preset waveform required for the same.

In FIG. 4, the arrow 401 designates the direction in which the tape is fed, and the arrow 402 the scanning direction of the magnetic head. Normally, the field reproduction is used for low-speed reproduction of one-fold or less. If the frame instead of field reproduction is used, two images are produced alternately at intervals of 1/60 seconds, so that a moving image is blurred in reproduction, thus deteriorating the image quality in the NTSC system.

For the purpose of field reproduction, the head scanning traces 403 in FIG. 4 are adapted for scanning the track B$_1$, and the head scanning traces 404 the track B$_2$. A preset waveform required for this purpose is shown in FIG. 5(b). FIG. 5(a) shows an H.SW signal.

If the conventional method mentioned above is applied to the ¼-fold speed reproduction shown in FIG. 5, the number of samplings is required to be 8. After j is set to 8, it is still necessary to decide whether the preset waveform sampled is represented by 501 or 502 shown in FIG. 5. Further, since the speed of special reproduction is not limited to ¼ times, the value cannot be limited to 8. Specifically, the method of reducing the center potential of the preset waveform sampled at intervals of j to zero cannot be easily applied to all given N-fold speed.

If the average DC level off the voltage applied to an electro-mechanical converter element is to be reduced to zero, it is necessary to take appropriate measure on the voltage waveform applied to each head for each frame.

FIG. 6 shows conventional voltage waveforms applied to each electro-mechanical converter element at the time of triple-speed reproduction.

In this drawing, character a designates an H.SW signal. In FIG. 6, the head A is contact with the magnetic tape during the "high" period, and the head B during the "low" period. FIG. 6(b) shows a voltage waveform for displacing the head A, and FIG. 6(c) a voltage waveform for displacing the head B. The voltage waveforms 601 and 602 are supplied to each electro-mechanical converter element to displace the respective heads. The applied voltage is positive in the direction of feeding the magnetic tape, and the voltage level is converted to track pitch (Tp). Take the head A as an example. At the time point when the magnetic head begins to be in contact with the tape, a voltage equivalent to −1Tp is applied, while at the time point when the magnetic head leaves the tape, a voltage equivalent to +1Tp is applied. In the meantime, the potential is changed in linear fashion. The voltage may take a given waveform during the time when the magnetic head is not in contact with the tape. In a normal method that has been used so far, a saw-toothed waveform shown by 603 in FIG. 6(b) is generated first, and this waveform is passed through a low-pass filter to obtain a waveform designated by 601, which in turn is applied to an electro-mechanical converter element.

This voltage waveform, however, has different sizes of areas of the parts designated by 604 and 605 as shown in FIG. 6(c). Specifically, the average DC potential is not zero, thereby posing the problem mentioned above.

SUMMARY OF THE INVENTION

The object of the present invention is to provide a method by which the average DC potential of the voltage waveform applied to an electro-mechanical converter element is rendered zero at the time of a special reproduction.

In order to achieve the above-mentioned object, according to one aspect of the present invention, there is provided a magnetic recording and reproducing apparatus comprising means for producing a weighted mean of the center level of the preset voltage for each field at least during the period when the center voltage changes from a maximum value to the next maximum value, and means for changing the center potential in order to cause the weighted mean to a predetermined value.

According to another aspect of the present invention, there is provided a magnetic recording and reproducing apparatus in which the time period from the point when the head leaves the magnetic tape to the point when it is brought into contact with the magnetic tape is halved, so that during the first half time, the voltage that is applied to the electro-mechanical element is held when the head leaves the magnetic tape, and during the last half time, a required voltage is held when the magnetic head begins to be in contact with the magnetic tape.

According to still another aspect of the present invention, there is provided a magnetic recording and reproducing apparatus in which the scanning track is determined on the basis of a speed command, and the amount of displacement necessary therefor is computed. In the process, the amount of displacement of the actuator at the central point of scanning corresponds to the DC component. From this value P, the compensated DC is computed from the equation below.

$$DC = -2 \frac{T_f}{T_f - T_s} P$$

where T$_f$ is the frame period, and Ts the time for one head scanning, that is to say, the time required for scanning one recording track. The compensated DC thus obtained is added to the final value for scanning during the first half time of the non-contact period of the head with a magnetic tape and applied to the head actuator as a displacement command, thereby always reducing to zero the average value (DC component) of the displacement command applied to the head actuator.

BRIEF DESCRIPTION OF THE DRAWINGS

FIG. 1 is a diagram showing a magnetization trace of a pilot signal having four frequencies.

FIG. 2 is a diagram showing head scanning trace for triple-speed reproduction.

FIG 3 (a) and (b) is a diagram showing an example of preset waveform for triple-speed reproduction.

FIG. 4 is a diagram showing the head scanning trace for ¼-speed reproduction.

FIG. 5 (a) and (b) is a diagram showing an example of a preset waveform for ¼-speed reproduction.

FIG. 6 (a) through (c) shows an example of the preset waveform obtained according to a conventional method.

FIG. 13 is a diagram showing a preset waveform for ¼-speed reproduction for explaining the principle of the first, second and third embodiments.

FIG. 14 (a) through (c) is a diagram for explaining a method of preparing a preset waveform.

FIG. 18 shows a preset waveform prepared in the fourth embodiment of the present invention.

DESCRIPTION OF THE PREFERRED EMBODIMENTS

First, explanation will be made about an embodiment in which the average DC voltage of a preset waveform is reduced zero in a given N-fold speed mode requiring a different preset potential for each field scanning.

Figure 7:
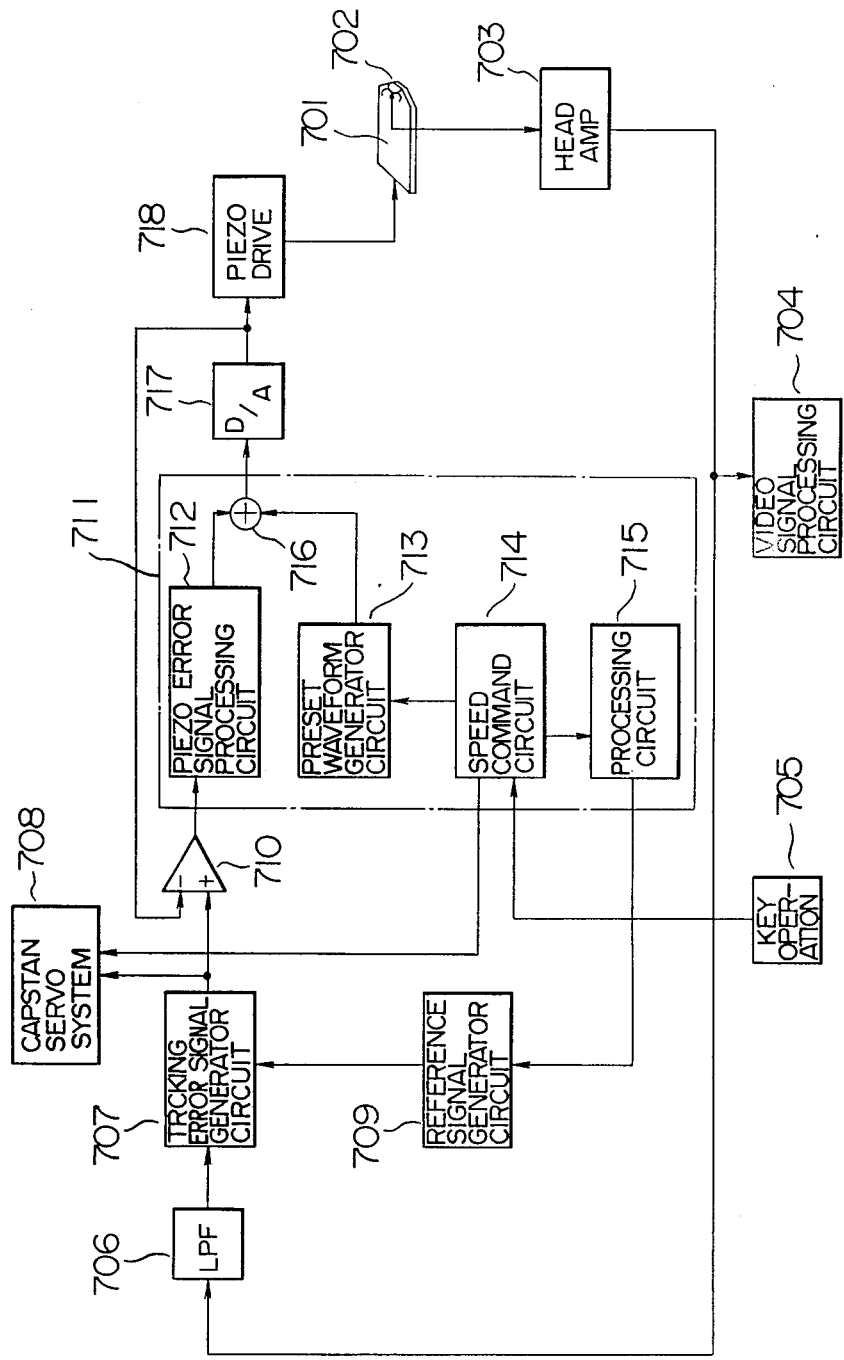
FIG. 7 is a block diagram showing a general configuration of the present invention.

FIG. 7 is a block diagram showing a configuration of the present invention as a whole. In FIG. 7, reference numeral 701 designates an electro-mechanical converter element including a piezoelectric element, for example. Numeral 702 designates a magnetic head. A signal reproduced from this magnetic head is amplified in a head amplifier circuit 703. The signal thus amplified is applied to a video signal processing circuit 704 where it is converted into a normal video signal for producing a reproduced image. An output signal of the head amplifier circuit 703 is applied to a low-pass filter 706, where only a reproduction pilot signal is taken out. Numeral 707 designates a tracking error signal producing circuit for producing a tracking error signal from the reproduced pilot signal. This circuit 707, which is well known will not be described in detail. The tracking error signal is applied to a capstan servo system to control the phase of the magnetic tape feed.

The circuit block shown in FIG. 7 other than those explained above includes a processing circuit for driving an electro-mechanical converter element at the time of one-fold speed reproduction (normal reproduction) and a special reproduction. Numeral 712 designates an error signal processing circuit for driving the electro-mechanical converter element. This circuit 712 has the main function to delay the tracking error signal by about one frame. Numeral 710 designates a comparator for comparing the level of the output signal of the tracking error signal producing circuit 707 with the level of the tracking error signal about one frame before, and in accordance with the difference between the two signal levels, applies a "high" or "low" signal to the piezo-error signal processing circuit 712. If the input signal of the piezo-error signal processing circuit 712 is "high", the tracking error signal stored in digital quantity for driving the piezo-electric element is incremented by $+1$, for instance, while if it is "low", the tracking error signal is decremented by $-1$, for example. The tracking error signal thus processed is used as a signal for driving the piezoelectric element about one frame later. The piezo-error signal processing circuit 712 is described in detail in Japanese patent application No. 197106/84. Numeral 717 designates a digital-analog converter circuit, and numeral 718 a drive circuit for the piezoelectric element. In the normal reproduction mode, the voltage applied to the piezoelectric element is determined by the circuits 710, 712, 717 and 718.

The processing for a special production will be described. In accordance with the key operation shown in the block 705, a speed command circuit 714 produces a reference speed value for feeding the magnetic tape. If the rapid feed key (FF) is depressed in reproduction (PB) mode, for example, a reference speed value for increasing the feed rate of the magnetic tape at a predetermined rate is produced, while if the rewinding key (REW) is depressed, a reference speed value for reducing the feed rate of the magnetic tape at a predetermined rate is produced. The reference speed value thus produced is applied to the capstan servo system 708 and is used for changing the feed rate of the magnetic tape. The reference speed value is also applied to a processing circuit 715. The processing circuit 715 is for deciding one of the reference signals $f_1$ to $f_4$ (having the same frequency as the pilot signal) to be produced. In normal reproduction mode, for instance, the reference signals $f_1$, $f_2$, $f_3$, $f_4$ are produced in that order for each field, while in triple-speed reproduction mode, $f_1$, $f_4$, $f_3$, $f_2$ are produced in that order. The reference signal to be produced for the next field is capable of being calculated from the reference signal now being produced and the feed rate of the magnetic tape. Numeral 709 designates a reference signal generator circuit for producing a reference signal in response to a command signal from the processing circuit 715. Numeral 713 designates a present waveform producing circuit for performing the operations including reduction of the average DC voltage to zero as intended by the present invention. This circuit will be described in detail later. The circuit block 711 is capable of being processed by use of a microcomputer, and explanation will be made below with reference to the case of processing with a program according to the present invention.

Figure 8:
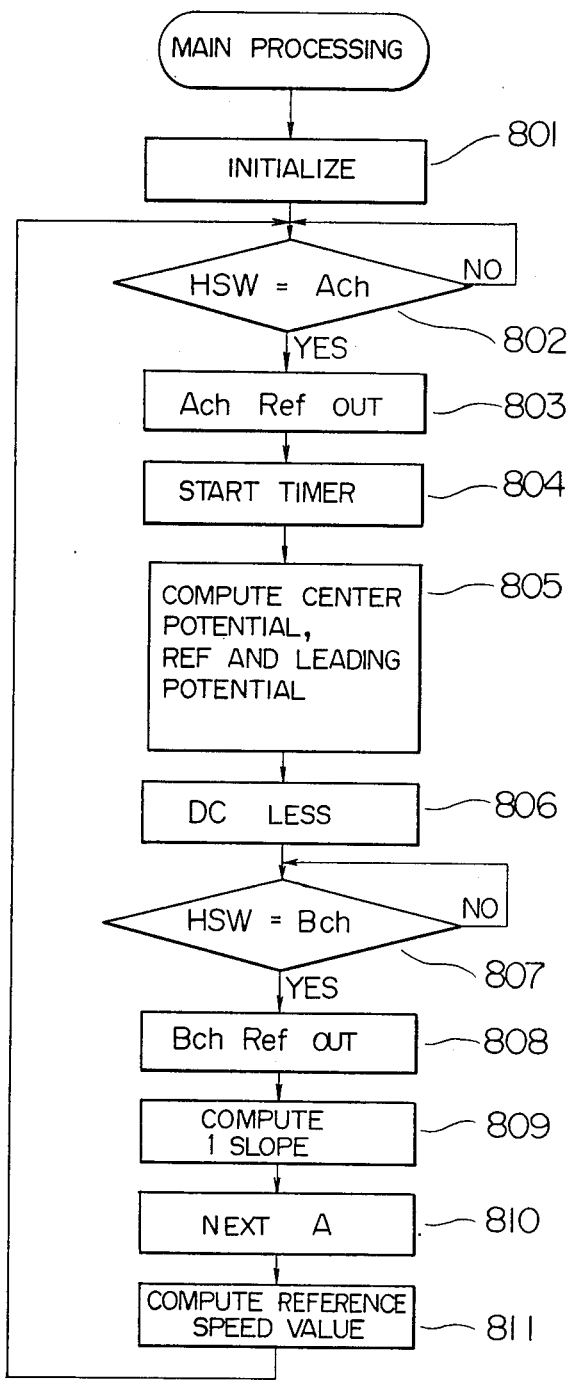
FIG. 8 shows an example of a flowchart of main processing routines according to first, second and third embodiments.

FIG. 8 is a flowchart showing an outline of the programmed processing in the block 711 in FIG. 7. The processing of the main routine shown in FIG. 8 is executed after power is thrown on. The processing step 801 is for setting an initial value such as an initial voltage applied to the piezoelectric element, a reference speed value and a reference signal. The step 802 is for deciding whether the level of the H.SW signal is "high" or "low", that is, whether the head A is in contact with the magnetic tape (Ach) or the head B is in contact (Bch). The step 802, on the other hand, decides whether the H.SW period covers Bch or not. The steps 803 to 806 are thus executed during the period Ach, and the steps 808 to 811 during the period Bch. The processing steps shown in FIG. 8 except for the steps 805 to 810 may be executed during any period. The step 803 is executed immediately after the change of the H.SW signal from the period Bch into the period Ach. The step 803 is for producing an initial value or a reference signal for the period Ach already computed. The step 804 is for starting an internal timer. The internal timer is set to a time which divides one frame into plural parts. The step 805 makes various computations produced during the period Bch. First, the center level of the preset potential used for the period Bch is computed. This center potential may be computed from the center level of the preset potential used one frame or one field before and the present feed rate (reference speed value) of the magnetic tape. Secondly, a reference signal is computed. The reference signal is computed from the reference signal used one frame or one field before and the reference speed value. Thirdly, the leading level of the preset potential is computed. Once the reference speed value is known, the amount of inclination of the whole preset potential is determined. As described later, this process is necessary for computing preset potential each time of timer interruption. The step 806 is for reducing the average DC potential to zero as intended by the present invention, and will be described in detail later.

Now, explanation will be made about the processing during the period Bch. The step 808 produces a reference signal used during the period Bch. The step 809 computes the amount of inclination of the present potential (hereinafter referred to as "the one-slope inclination") during the 1/i period as a result of dividing one field into i parts. The method of using the one-slope inclination will be described later. The step 810 is for executing the same process as mentioned above for the step 805. The step 810 computes a reference signal, leading potential and the center potential of the preset waveform used during the period Ach. The step 811 is for computing the reference speed value in accordance with the key operation. The speed command signal applied to the capstan servo system shown in FIG. 7 may be considered to be processed in the step 811.

Figure 9:
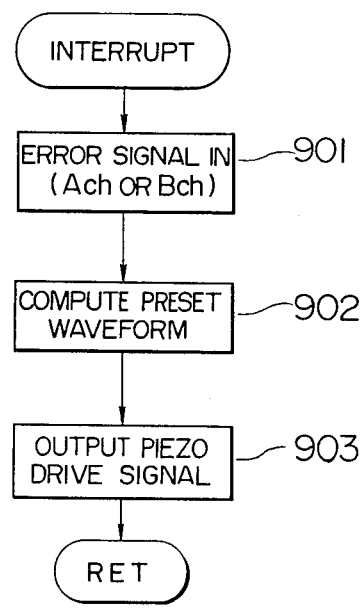
FIG. 9 shows an example of a flowchart of the timer interruption processing according to first, second and third embodiments.

The processing for timer interruption will be explained. FIG. 9 is a flowchart showing the processes for timer interruption. FIG. 14 is a diagram showing a preset waveform and the timing of timer interruption. In FIG. 14, (a) represents the H.SW signal, and (b) the timing of the timer interruption. In this example, one field is divided into 12 parts. At the time points $t_1$, $t_2$, $t_3$, . . . shown in FIG. 14(b), the interruption processing program of FIG. 9 is executed. In FIG. 9, the step 901 is for applying a tracking error signal. This processing is for incrementing or decrementing the value of the tracking error signal by ±1 in response to the input signal of the comparator circuit 710 of FIG. 7. The step 902 computes and produces the output potential of the preset waveform. The output waveform is shown in FIG. 14(c). As explained above, the leading potential of the preset potential and the one-slope amount of inclination are already known. In FIG. 14(c), the potential at the time point $t_1$ is the above-mentioned leading potential. The potential at time point $t_2$ is a potential equivalent to one-slope obtained by adding the amount of inclination to the potential at time point $t_1$. This also applies to the processes after $t_3$, by which a preset waveform as shown in FIG. 14(c) is obtained. The preset waveform shown in FIG. 14(c) is applied through a low-pass filter to a piezoelectric element, and therefore the actual applied voltage takes a smooth waveform. In FIG. 9, the step 903 produces a drive signal for the piezoelectric element, which is the sum of the preset potential and the tracking error signal.

Now, the process for reducing the average DC voltage to zero will be explained. FIG. 13 is for explaining the principle of this method with reference to the ¼-speed reproduction as an example. In FIG. 13, (a) is an H.SW signal, and (b) a preset waveform for ¼-speed reproduction. In FIG. 13, the center potential of the preset waveform undergoes a variation shown by 1301 to 1308. As a result, the average DC potential represents the point shown by 1314. If the potential shown by 1314 is reduced to zero, it is possible to reduce to zero the average DC potential applied to the electromechanical converter element. For this purpose, the weighted average of the center potentials of the respective preset waveforms shown by 1301 to 1308 is obtained. Specifically, the eight potentials designated by 1301 to 1308 are added and the sum is divided by eight, thus giving an average DC potential. More specifically, the maximum and minimum values of each center potential are determined, and the average value of them is calculated. Generally, the variation of each center value of a preset waveform for an N-fold speed reproduction has a predetermined cyclic characteristic. Therefore, by determining the number n of repetitions of the preset waveform occurring in the longest period of the device (VTR) involved and selecting the maximum and minimum values of the n center potentials, the maximum and minimum values of the center potentials for a given N-fold speed reproduction are obtained. For the n samplings, any point may be selected for starting. This is because in FIG. 13(b), the maximum and minimum values of the center potentials are the same regardless of whether the center potentials of 1301 to 1308 or 1303 to 1310 are sampled. Depending on the program, instead of the weighted average of the center values of the preset waveforms, an weighted average may be taken of the average values of the center potential during the periods Ach and Bch, or for example, the weighted average of the average values between 1301 and 1302. In other words, the weighted average of 1311 to 1317 is taken.

A specific process for p;producing a weighted average will be explained below.

Figure 10:
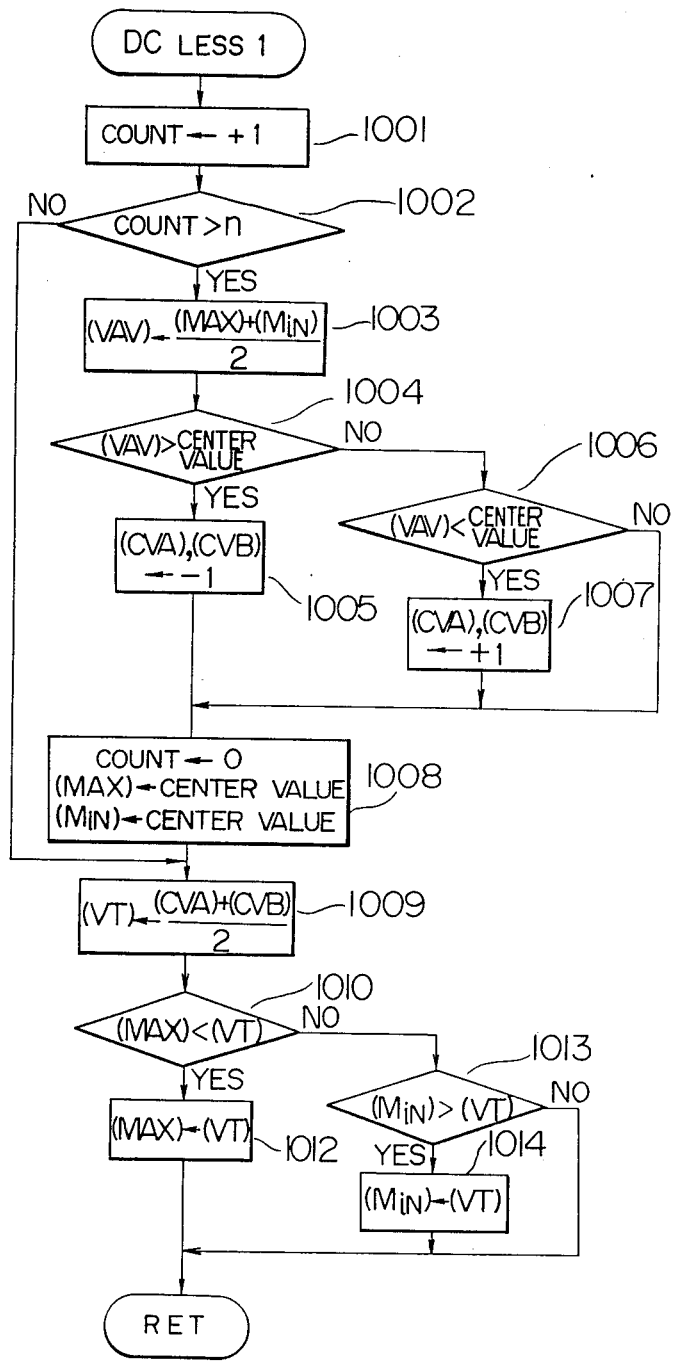
FIG. 10 is a flowchart showing a first embodiment of the present invention for reducing the average DC potential to zero.

FIG. 10 shows a processing program for reducing the average DC potential to zero, as a specific example of the processes shown by 806 in FIG. 8. The step 1001 increments the count by +1 each time of execution of the process shown in FIG. 10. The step 1002 decides whether the count is larger than a predetermined value n. The value n represents the number of preset waveforms repeated during the longest cycle for the device involved as described above. If the count is larger than n, the steps 1003 to 1008 are executed, and if it is n or smaller, the steps 1009 to 1014 are executed. The step 1009 takes an average of the center potential (CVA) of the preset waveform during the period Ach and the center potential (CVB) of the preset waveform during the period Bch, and has it stored in RAM of VT. If the value VT is found larger than the maximum MAX at the step 1010, the value VT is substituted into RAM as a new maximum value of VT at the step 1012. If VT is smaller than the value MAX, on the other hand, the step 1013 is executed, and if VT is smaller than the value MIN, the step 1014 substitutes the value VT into RAM of MIN. Unless MIN is larger than VT, the process is terminated. Specifically, by repeating the steps 1009 to 1014, the maximum and minimum values of the center potentials of the preset waveforms repeated n times are capable of being stored in the RAM of both MAX and MIN. When the count exceeds n, the step 1003 is executed. The step 1003 takes an average of the maximum and minimum values for the n processes repeated, and has it stored in the RAM of VAV. The step 1004 decides whether the value VAV is larger than the center potential, that is, the average DC potential of zero, and if the answer is "yes", the step 1005 corrects the center value (CVA) during the period Ach and the center value (CVB) during the period Bch by a small amount, say, −1. If the value VAV is found smaller than or equal to the center potential, on the other hand, the step 1006 decides whether it is smaller than the center potential. If it is smaller than the center potential, the step 1007 increases the values of CVA and CVB by a small amount, say, +1. After that, the step 1008 reduces the count to zero, and setting the RAM of MAX and MIN to the center value, take n samples again.

The process shown in FIG. 10 is for determining the maximum and minimum values of the average center value for the periods Ach and Bch. As explained above, the maximum and minimum values of the center potentials may be determined alternatively. The latter method will be explained with reference to FIG. 11.

Figure 11:
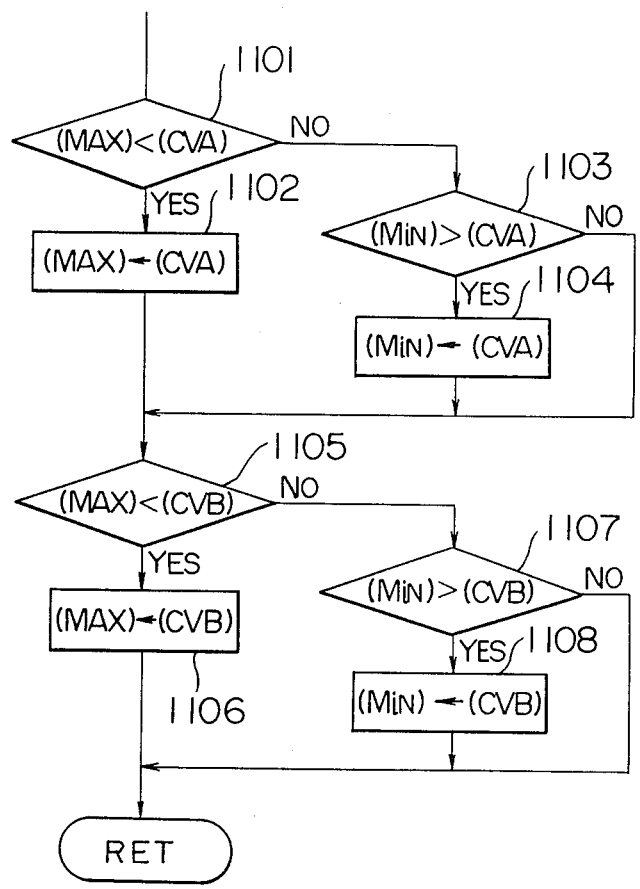
FIG. 11 is a flowchart showing a second embodiment of the prevent invention.

The process shown in FIG. 11 includes different steps from 1009 in FIG. 10. In FIG. 11, steps 1101 to 1104 are for determining whether the value CVA is larger than the pass MAX or MIN values. If CVA is larger than MAX, the step 1102 substitutes the CVA value into RAM shown by MAX, and if CVA is smaller than MAX, the step 11-4 substitutes the value CVA into RAM shown by MIN. A similar process is taken also for CVB, so that if the value CVB is larger than MAX, the step 1106 substitutes CVB into RAM shown by MAX, and if the value CVB is smaller than MAX, the value CVB is substituted into RAM shown by MIN at step 1108. By these processes, the maximum and minimum values of the center potentials of the respective preset waveforms are selected.

The processes described with reference to FIGS. 10 and 11 are for determining the number n of samplings instead of using a multiple value of speed. Now, explanation will be made about a method of processing in which the number of samplings can be selected as desired in accordance with a multiple speed value.

Figure 12:
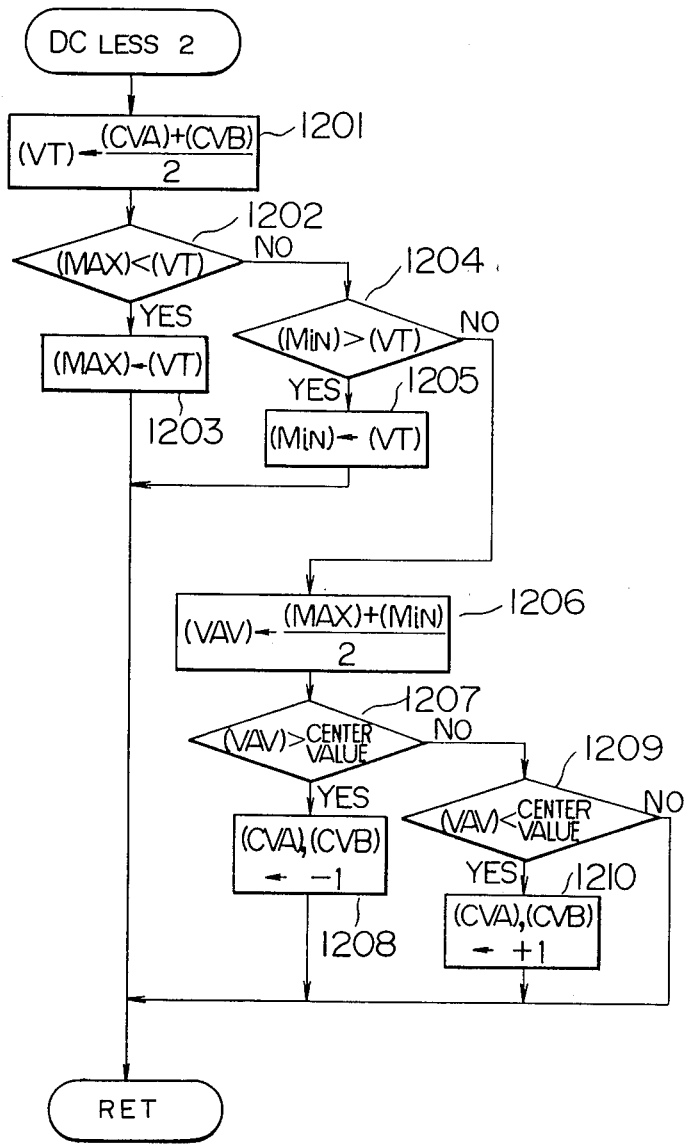
FIG. 12 is a flowchart showing a third embodiment of the present invention.

In FIG. 12, the step 1201 substitutes the average value of CVA and CVB into RAM shown by VT. The steps 1202 to 1205 decides whether VT is larger than MAX or smaller than MIN or between MAX and MIN, and a process is followed accordingly in this block. If the value VT is larger than MAX, the step 1203 substitutes the value VT into RAM shown by MAX, and if it is smaller than MIN, the step 1205 substitutes the value VT into RAM shown by MIN. If the value VT is between MAX and MIN, it indicates that the values of MAX and MIN have already been selected. Even if the number n of times is not set, therefore, the values MAX and MIN may be considered to have been selected when the step 1206 is executed. The step 1206 determines the average of the values MAX and MIN, and substitutes the average into RAM shown by VAV. The steps 1207 and 1209 decide whether VAV is larger or smaller than the center value. If VAV is larger than the center value, the step 1208 subtracts the values CVA and CVB by −1, and if VAV is smaller than the center value, the step 1210 adds the CVA and CVB by +1 to complete the process. FIG. 12 shows the method of determining the maximum and minimum values of the average of CVA and CVB. Alternatively, the maximum and minimum values of CVA and CVB may be determined with equal effect in the manner described with reference to FIG. 11.

The foregoing explanation concerns the process for reducing the average DC voltage to zero for each frame as shown in FIG. 8. This process, however, may be executed for each field with equal effect.

Further, although a method of configuring the whole control system by use of pilot signals of four frequencies is described above, the control system is not limited to pilot signals of four frequencies to reduce the average DC voltage of a preset waveform to zero.

Now, an embodiment will be explained in which the average DC voltage of a preset voltage waveform for each frame scanning of each head is reduced to zero with reference to a case of triple speed feed.

Figure 15:
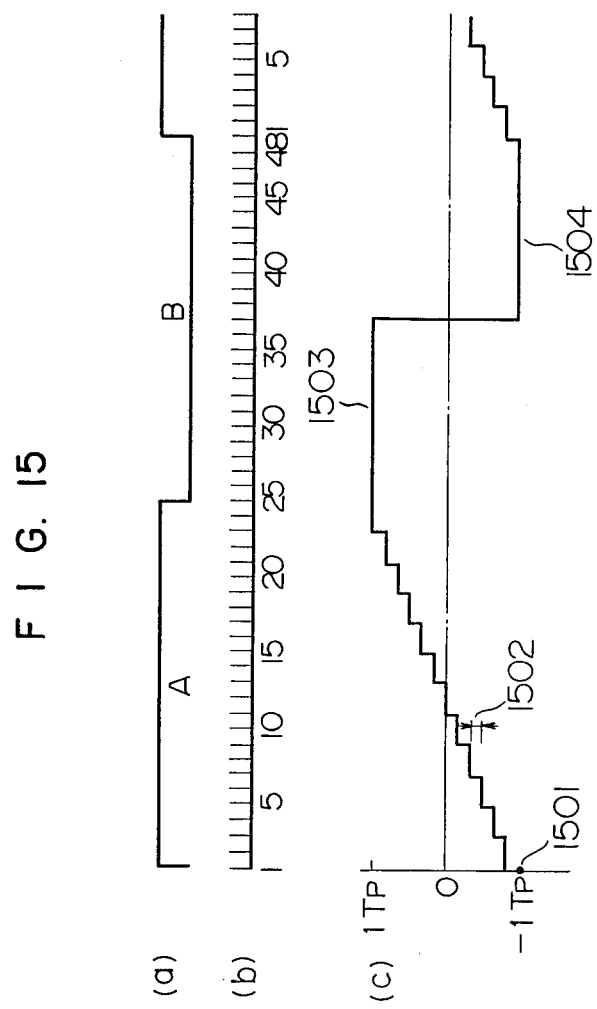
FIG. 15 (a) through (c) is a diagram showing the timing of the timer interruption and a preset voltage waveform according to a fourth embodiment.
Figure 16:
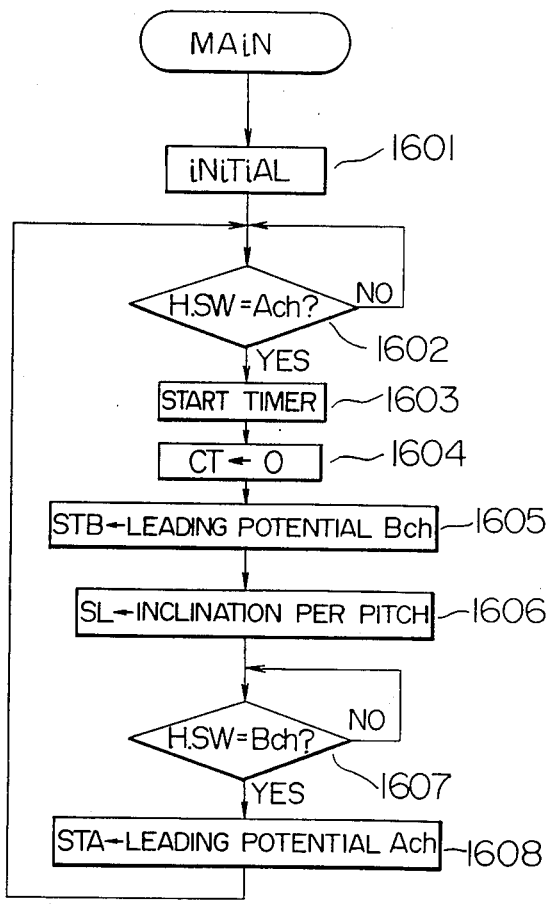
FIG. 16 shows an example of the flowchart showing the main processing routine including the fourth embodiment of the present invention.
Figure 17:
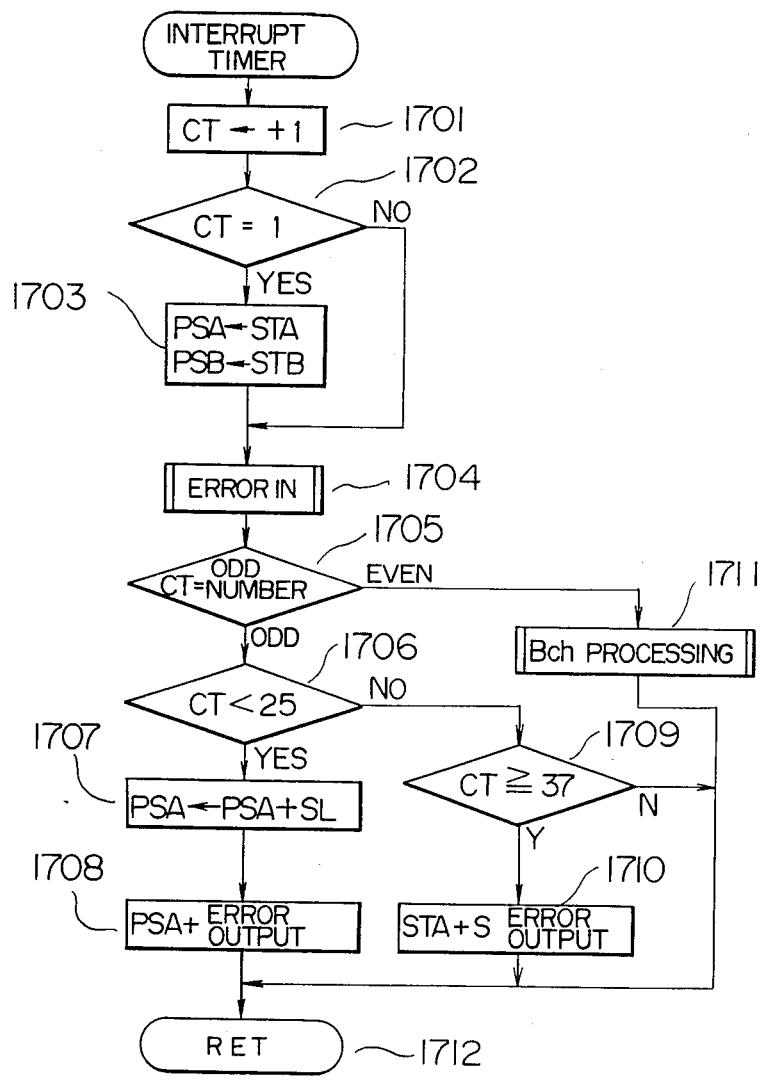
FIG. 17 shows an example of the timer interruption processing according to the fourth embodiment of the present invention.

FIG. 15 is a diagram showing preset waveforms according to the present invention, FIG. 16 a flowchart showing the main process of producing a preset waveform, and FIG. 17 a flowchart showing the process of timer interruption for producing a preset waveform. In explaining FIGS. 16 and 17, FIG. 15 will be used appropriately as an auxiliary material. In FIG. 15, character a designates an H.SW signal, and character b the number of interruptions and the timing of timer interruption. Character c designates a preset waveform produced by the process mentioned later, with the ordinate representing the magnitude of the preset potential as converted into the track pitch Tp.

FIG. 16 is a diagram showing the process required as a minimum condition for producing a preset waveform as a flowchart, which actually includes various other processes. In FIG. 16, the step 1601 sets an initial value, such as the leading potential of magnetic heads A and B or the amount of inclination per pitch to a predetermined value. The step 1602 decides whether the H.SW signal represents the period during which the head A is in contact with the magnetic tape. While the head A is not in contact with the tape, the step 1603 and subsequent steps are not executed until the time point when the head A is brought into contact with the magnetic tape. The step 1603 is for starting the internal timer. The constant of the timer, which may be any given value by which one frame is divided, is set to a value by which one frame is divided into 48 parts as shown in FIG. 1, for instance. As described later, the value CT is incremented by +1 each time of timer interruption, and therefore it is possible to store the number of times of timer interruption shown in FIG. 15(b). The step 1605 determines the leading potential of the head B and stores the result in the RAM designated by STB. The leading potential of the preset waveform is capable of being determined once the tape feed rate for a special reproduction is determined. Take the head A as an example. The leading potential takes a value designated by 1501 in FIG. 15(c). The step 1606 computes the amount of inclination for a pitch as a result of dividing the whole amount of inclination by N, and stores the result into the RAM shown by SL. The amount of inclination per pitch is designated by 1502 in FIG. 15. Once the amount of inclination SL per pitch is known, the value SL is added each time of timer interruption, thereby producing an inclined waveform shown in FIG. 15(c). The step 1607 decides whether the H.SW signal is associated with the period during which the head B is in contact with the magnetic tape. If the head B is not in contact with the tape, the operation is suspended, while if the head B is in contact with the tape, the step 1608 is executed. The step 1608 determines the leading potential of the head A, and stores it into the RAM shown by STA. After that the step 1602 explained above is executed. The computation of STA and STB is effected while the heads are not in contact with the tape so that the computation may be used immediately after the heads are brought into contact with the tape.

The main processes are described above. If a timer interruption is called during the main processes, the timer is interrupted as shown in FIG. 17. Explanation will be made below with reference to FIG. 17.

In FIG. 17, the step 1701 increments the value of RAM shown by GT by +1. The value CT is cleared when the H.SW signal comes to be associated with the period for head A as mentioned above, and therefore represents the number of times of subsequent timer interruptions. The step 1702 decides whether the value CT is 1, that is, whether the first timer interruption is involved during the period for head A. If CT is 1, the step 1703 stores the leading potential STA and STB respectively in the RAM designated by PSA and PSB. If CT is not 1, on the other hand, the step 1703 is not executed, but the step 1704. The step 1704 is a subroutine for receiving and processing a tracking error signal. In this step, the process of which will not be explained in detail, a tracking error signal is applied for each predetermined timer interruption, and after comparison with the tracking error signal of one frame before, the value of the next tracking error signal to be produced is incremented or decremented by ±1. The step 1705 decides whether the value CT is odd or even number. If it is an odd number, the processes of step 1706 and subsequent steps are executed, and if it is an even number, the step 1711 is executed. Specifically, as shown in FIG. 15, if the value of CT is an odd number, the preset waveform of the head A is processed, and if the value is an even number, though not shown, the preset waveform of the head B is processed. The step 1706 decides whether the value CT is smaller than 25 or not. If the value CT is smaller than 25, it indicates that the period for the head A is involved as will be easily seen from FIG. 1. Then, the step 1707 is executed, so that the amount of inclination SL per pitch is added to the preset potential PSA for the head A, and a new preset potential is stored in the RAM designated by PSA. Specifically, at the time of first timer interruption, the value SL is added to the leading potential, and the value SL is further added at the time of the third timer interruption, thus making it possible to produce a preset waveform in step form as shown in FIG. 15(c). The step 1708 adds the prevailing preset potential PSA to the error signal and produces the sum. If the step 1706 decides that the value of CT is larger than or equal to 25, the step 1709 is executed. The step 1709 decides whether the value of CT is smaller than 37 or not. If it is smaller than 37, the timer interruption process is terminated. In this case, the step 1708 is not executed. Specifically, no new output is produced, and therefore the sum of the preset potential before the step 1709 and the value of the error potential is held. The potential of the part designated by 1503 in FIG. 15 represents such a value, and a constant potential is held until the value of CT becomes equal to 37. When the value of CT reaches 37 or more, the step 1710 is executed. The step 1710 is for producing the sum of the leading potential STA of the head A and the error potential at the time of starting the period for head A. By this step, the potential shown by 1504 in FIG. 15 is held during the period when the value of CT is kept between 37 and 48. Although the steps 1706 to 1710 concern the head A, the same processes may be taken for the head B. When CT is an even number, the step 1711 may produce a preset potential for head B, although not described in detail.

FIG. 18 is a diagram showing preset waveforms for the heads A and B according to the present invention. In FIG. 18, character a designates an H.SW signal, character b a preset waveform for head A, and character c a preset waveform for head B. As is apparent from the drawing, the areas designated by 1801 and 1802 are equal to each other. As a result, the average DC potential applied to the electro-mechanical converter element can be reduced to zero.

The foregoing description relates to a case in which the time during which the head is in contact with the tape is assumed to represent one field. The same concept may be applied to the case where it is longer than a field of time. If the track having recorded therein a PCM signal compressed along time axis is positioned in the front part of the track carrying a video signal recorded as in the 8 mm video and these two tracks are required to be reproduced in special reproduction mode, the inclination of the preset waveform extends by a length equal to the PCM track. As a consequence, the areas of positive and negative voltage applications become equal with respect to the line of potential zero applied to the electro-mechanical converter element. Even in this case, it is possible to reduce the average DC potential to zero by moving the potential switching position between 1503 and 1504 shown in FIG. 15 (CT=37 in the foregoing description).

Now, explanation will be made about an embodiment in which the average DC voltage of a preset voltage waveform for each frame scanned by each head is reduced to zero with reference to still production.

Figure 20:
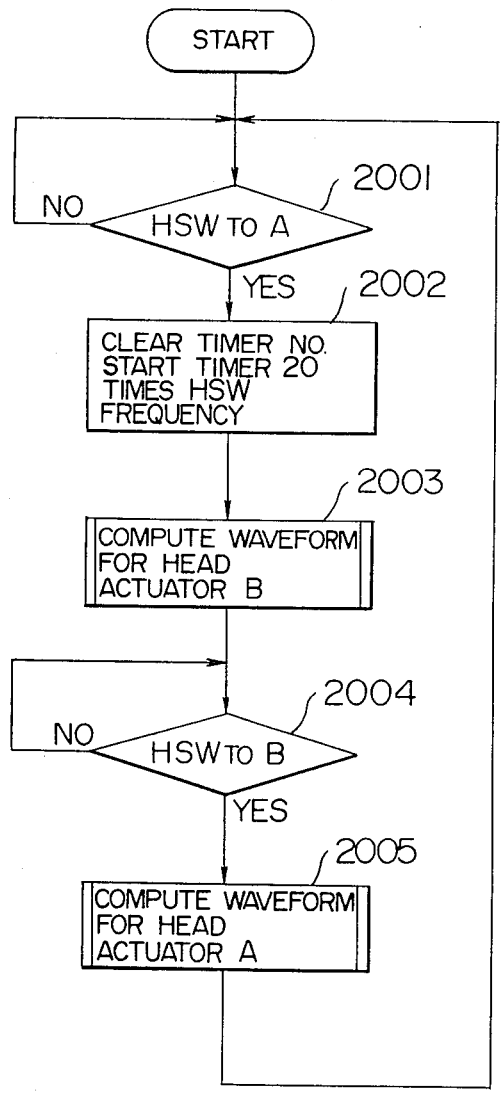
FIG. 20 shows an example of flowchart of the main processing routine according to the fifth embodiment.
Figure 23:
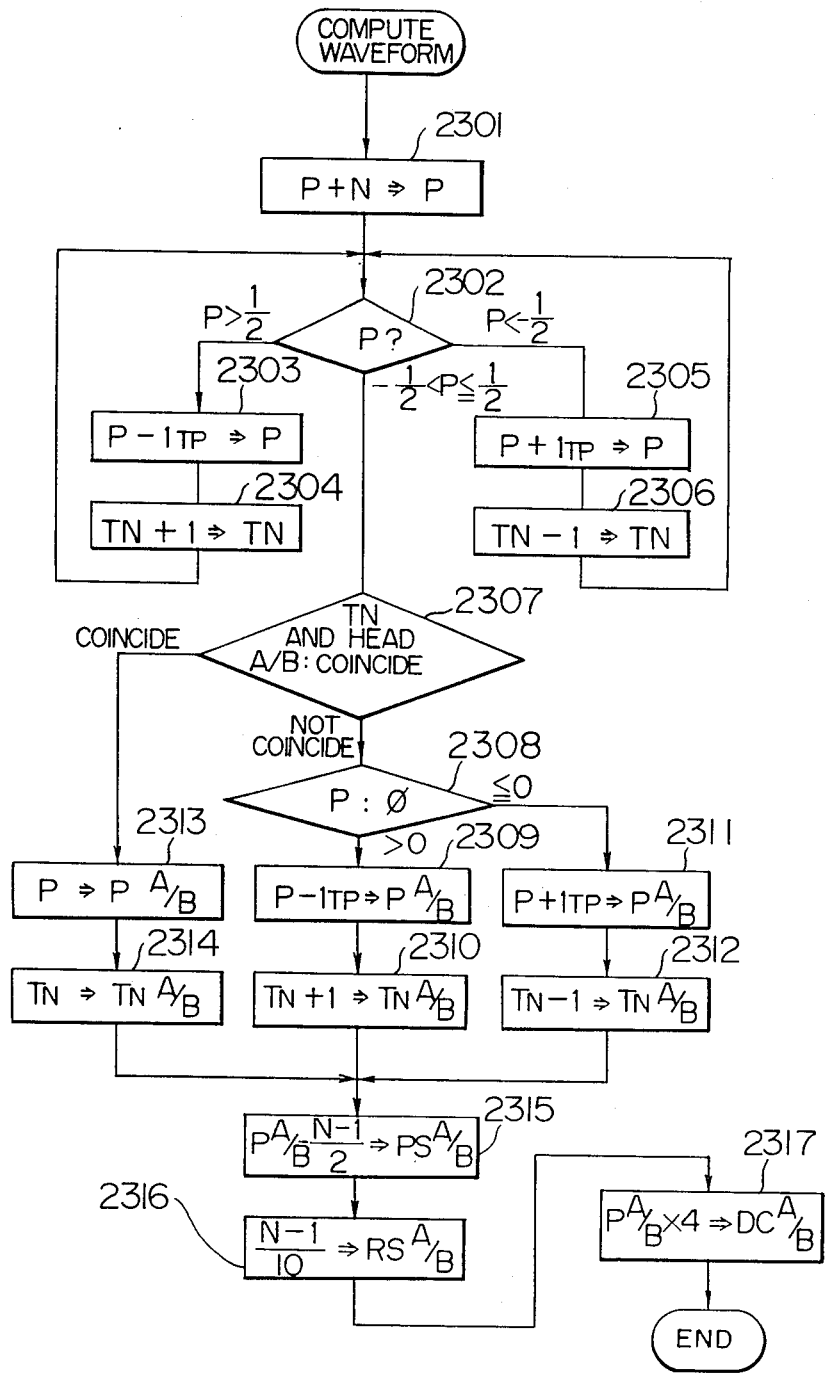
FIG. 23 is a flowchart showing the processing steps of the waveform processing section in FIG. 20.

FIG. 20 is a flowchart schematically showing the processes in the microcomputer. First, the step 2001 waits until the H.SW signal switches to head A. If the H.SW signal is on head A side, the process is passed to step 2002, where the number of times of timer interruption, that is, timer No. is cleared, and a timer of a frequency 20 times the H.SW signal is started. The timer is thus initialized. The step 2003 computes the preset waveform of head actuator B for the scanning by head B, that is, the next field. Details of this computation are shown in FIG. 23 and will be described later. Then, the step 4 waits until the H.SW signal switches to the head B side. When the H.SW signal switches to head B side, the process proceeds to the step 2005 for computing the preset waveform of the head actuator A for the head scanning. The nature of the computation is substantially the same as the step 2003 and will be described later. After this computation, the process is returned to step 2001 to wait until the H.SW signal switches to head A again. In this manner, the preset waveform is computed sequentially for each field, thus making possible reproduction at a given reproduction speed.

Figure 21:
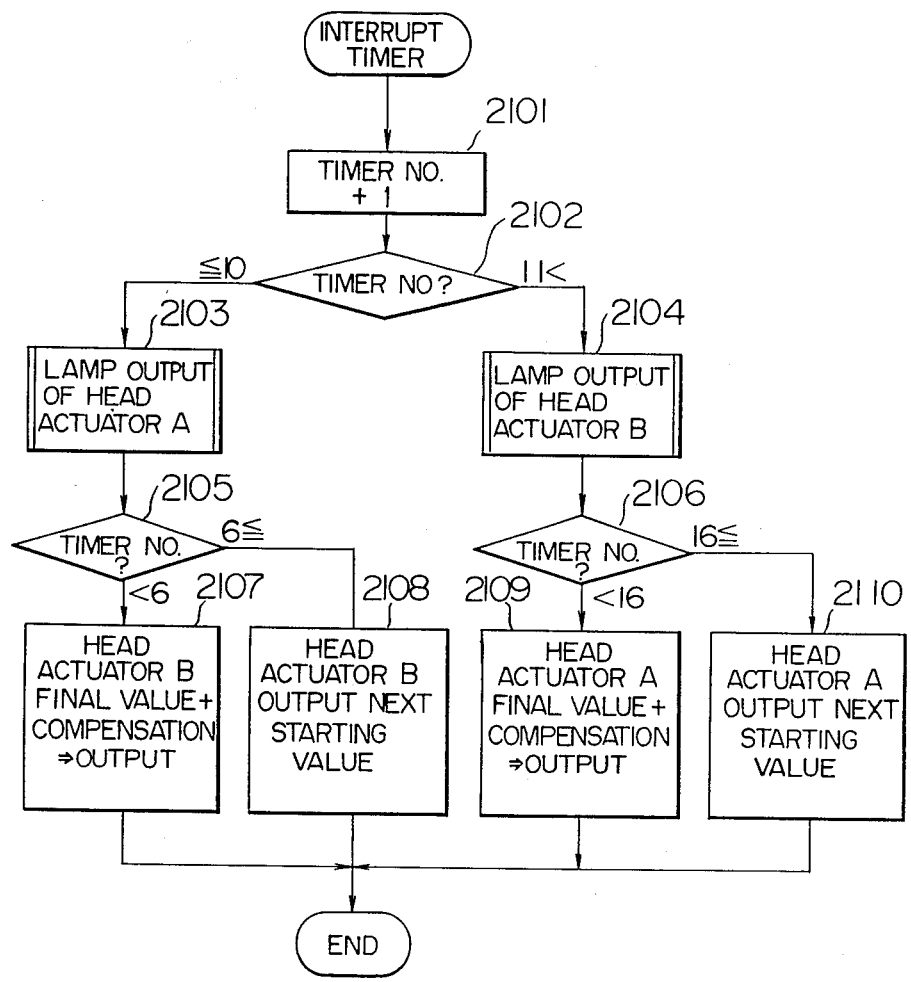
FIG. 21 shows an example of the flowchart for timer interruption processing according to the fifth embodiment.

FIG. 21 is a flowchart showing the interruption procedures by the timer started at the step 2002. First, the step 2101 counts increments the timer No. by +1 and counts the number of interruptions. The step 2102 decides whether the timer No. is 10 or less. If the timer No. is 10 or less, H.SW signal on the head A side, and the process is passed to the step 12 for applying a ramp waveform command to the head actuator A. The manner in which the ramp waveform is prepared will be explained with reference to FIG. 22. The step 2105 decides whether H.SW signal is associated with the first or last half of the head A period. That is to say, if the timer No. is 1 to 5, the first half is involved, and if it is 6 to 10, the second half is involved. If the first half is involved, the process is passed to the step 2107 for compensating for the DC component of the head actuator B. Specifically, the compensation value is added to the final value of the ramp section of the head actuator B, and the sum is used as a drive command for the head actuator B. The final value for the ramp section is the sum of the value of the preset waveform left in the memory and the tracking error signal value. If the second half of the head A period is involved, on the other hand, the process proceeds to the step 2108 for applying a displacement command value for starting the next head B scanning to the head actuator B. By doing so, any delay of the actuator response can be fully met. This process is necessary especially in view of the fact that the response is often delayed when a low-pass filter inserted in the output of a DA converter.

If the step 2102 finds that the time No. is larger than 11, that is to say, that the H.SW signal on head B sides, the process is passed to the step 2104 to apply a ramp waveform command to the head actuator B. Then, the step 2106 decides whether the first or second half of the head B scanning is involved by use of the timer No. First, if the first half is involved, the process is passed to the step 2109 to compensate for the DC component of the head actuator A in the same manner as mentioned with reference to the step 2107. If the second half of the head B scanning is involved, by contrast, the step 2110 produces a displacement command for starting the next head A scanning. The timer interruption processes are over.

Figure 22:
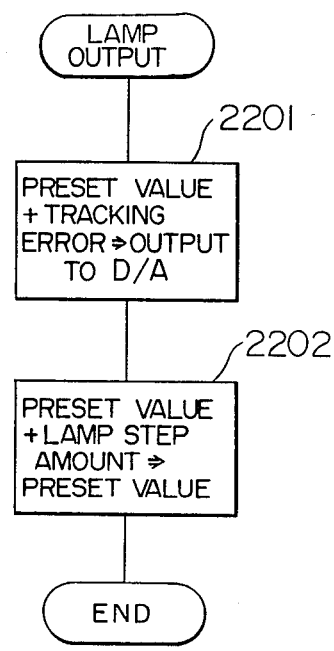
FIG. 22 shows a flowchart of the steps of processing of the ramp output section in FIG. 21.

FIG. 22 is a flowchart showing the procedures for generating ramp waveform described with reference to the steps 2103 and 2104 in FIG. 21. First, the step 2201 adds the memory value (preset value) to the value of the tracking error signal, and applies the sum to the DA converter. For the purpose of the step 2103 of FIG. 21, the preset value, tracking error and DA converter for the actuator A are used while for the purpose of the step 2104 of FIG. 21, the preset value, tracking error and the DA converter for the actuator B are used. The step 2202 adds the step value of the ramp waveform to the preset value and the sum is used as a new preset value. The step value of the ramp waveform indicates the unit change for each timer interruption. Since this process is executed each time of timer interruption, a stepped waveform with step values is obtained thereby to produce an approximate ramp waveform.

FIG. 23 is a flowchart showing the procedures of the steps 2003 and 2005 in FIG. 20. Different processes are required for actuators A and B. Since most of the steps are the same for actuators A and B, however, only one flowchart is shown. The expression "A/B" indicates "A or B". First, the part designated from steps 2301 to 2306 represents processes for selecting the nearest track in accordance with the speed. The step 2301 adds a multiple speed command N to the present tape position P (corresponding to the head position relative to the position nearest to the track, expressed in track pitches) to make a new P. The step 2302 studies the value of P. If the value P is larger than the ½ track pitch, the process proceeds to the step 2303, if it is smaller than −½ track pitch, the process is passed to the step 2305, and if it holds the relations −½<P ≦½, the process is passed to the step 2305. The steps 2305 and 2304 subtract one track pitch from the value P and adds one track name TM. The process is then returned to the step 2302. The steps 2305 and 2306, contrary to the steps 2302 and 2304, add one track pitch to the value P thereby to reduce the track name TN by one. After that, the process returns to the step 2302. The steps 2307 to 2312 determine the track $TN_A$ or $TN_B$ actually scanned in such a manner that the nearest track coincides with the azimuth of the scanning head. First, the step 2307 checks to see whether the track name TN coincides with head A or B. This decision is easy, if the heads A and B are assigned with odd and even numbers of the track name TN respectively. If the track name fails to coincide with the head name, the process is passed to the step 2308 to make a change to attain the coincidence. The steps 2308 to 2312 select the second nearest track. First, the step 2308 checks whether the tape position P is positive or negative. If it is positive, the process proceeds to the step 2309, while if it is negative, the process is passed to the step 2311. The step 2309 subtracts one track pitch from P to provide an actual drive command for the head actuator A or B, followed by the step 2310 for adding one to the track name TN thereby to provide an actual track name $TN_A$ or $TN_B$. If the step 2308 finds that the value P is negative, by contrast, the process proceeds to the step 2311 for adding one track pitch to P to drive the actual head actuator A or B, followed by the step 2312 for subtracting 1 from the track name TN to provide an actual scanning track $TN_A$ or $TN_B$. In the case where the step 2307 finds that the head coincides with the track name, on the other hand, the process proceeds to the step 2313, so that the value P is directly used as a drive command for the actual head actuator A or B to use the track name TN directly as $TN_A$ or $TN_B$ actually scanned. In this way, the actual track is determined.

The process then proceeds to the step 2315 to determine the drive command $PS_A$ or $PS_B$ for starting the head scanning. This command is obtained by subtracting a half of the change of the ramp section from the drive command determined. The amount of change of the ramp section is given as (N−1) track pitches. Thus by subtracting ½ (N−1) from $P_A$ or $P_B$, this purpose is attained. The step 2316 determines the step amount $RS_A$ or $RS_B$ of the ramp section. According to the embodiment under consideration, one head scanning is divided into ten parts, and therefore the calculation $RS_{A/B}=1/10$ (N−1) is performed. The next step 2317 determines the step 2317 determines the compensation amount $DC_A$ or $DC_B$ of the DC component. $P_A$ and $P_B$ correspond respectively to the DC components. In the case where these DC components are compensated during the first half of non-contact period of the head with a magnetic tape, the amount of compensation is given by the equation below.

$$DC_{A/B} = -2\frac{T_f}{T_f - T_s} P_{A/B}$$

where $T_f$ is the frame period (1/30 second for NTSC) and $T_s$ the head scanning period (1/60 second for NTSC, but 1/50 second for PCM audio reproduction with the 8 mm video). The present embodiment covers the cases in which $T_f = 1/30$ and $T_s = 1/60$, as seen from the equation below.

$$DC_{A/B} = -4 \cdot P_{A/B}$$

Figure 19:
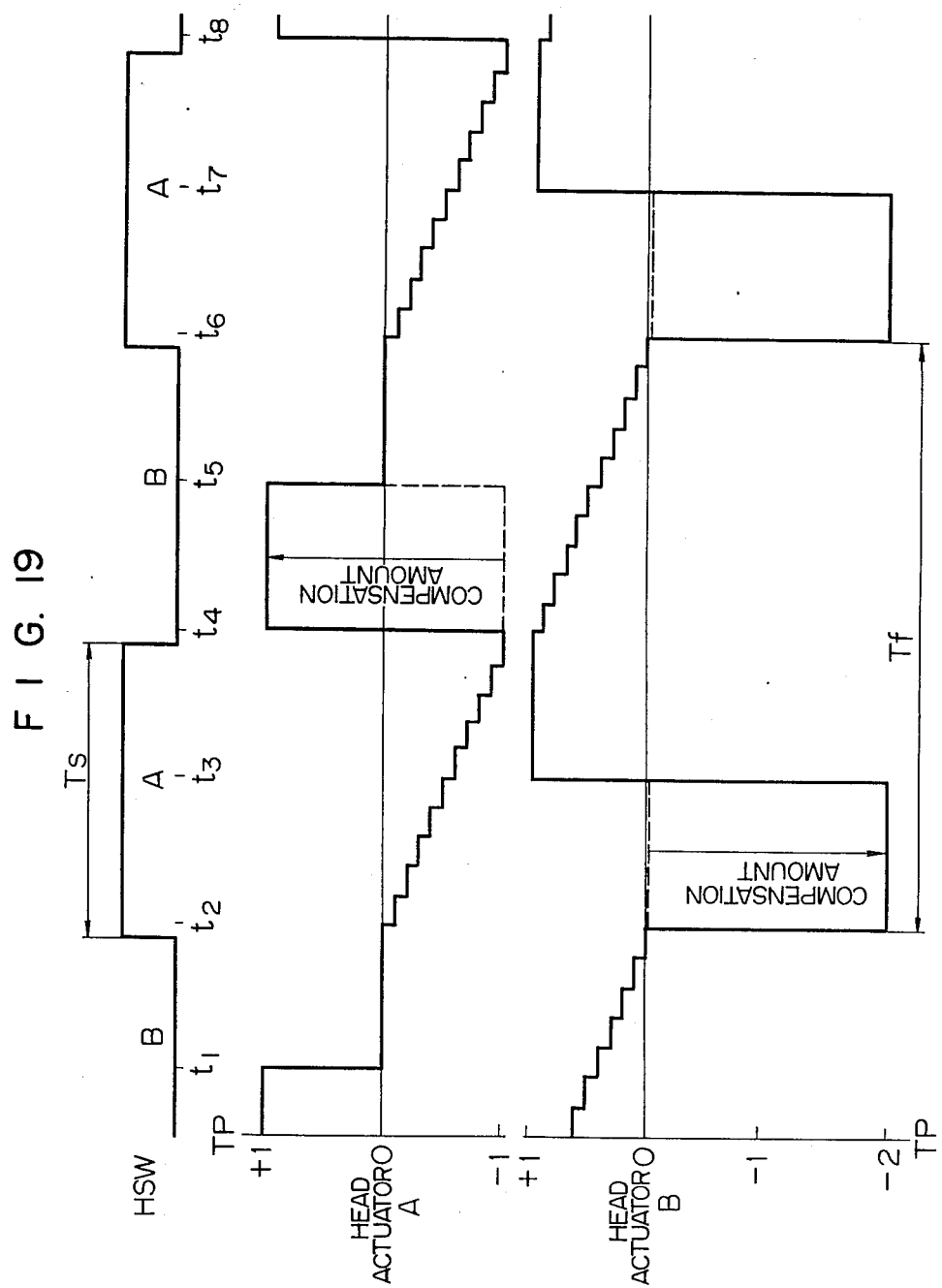
FIG. 19 shows a preset waveform for still reproduction according to a fifth embodiment of the present invention.

FIG. 19 shows drive commands actually applied to the head actuators A and B by the processes mentioned above. At the time point $t_1$, the head actuator A produces a drive signal for starting the next scanning; between $t_2$ and $t_4$, produces a ramp-shaped waveform, and between $t_4$ and $t_5$, compensates for the DC components. The head actuator B, on the other hand, compensates for the DC components from time points $t_2$ to $t_3$, produces a drive output for starting the next scanning for time from $t_3$ to $t_4$, produces a ramp-shaped waveform for the time from $t_4$ to $t_6$, and compensates for the DC component for the time from $t_6$ to $t_7$. In this way, neither head A nor B is supplied with the average DC component for each frame. The average DC component in a frame $T_f$ from $t_1$ to $t_5$ for the head actuator A, or in a frame $T_s$ from $t_3$ to $t_7$ for the head actuator B is reduced to zero.

It will thus be understood from the foregoing description that according to the present invention, the average DC voltage of a preset waveform in N-fold speed mode is reduced to zero on the one hand, and the DC component is capable being compensated for the DC component by a simple method during the non-contact period of the head on the other hand, thereby preventing the deterioration of the characteristics of the piezoelectric element without reducing the dynamic range on the other hand.

Although the main processing steps and timer interruption are explained separately above for each embodiment for convenience of explanation, these processes may of course be included collectively in a required loop.

What is claimed is:

1. A magnetic recording and reproducing apparatus with a movable head comprising an electro-mechanical converter element, a rotary magnetic head mounted on said electro-mechanical converter element, a cylinder including the rotary magnetic head, a magnetic tape wound diagonally on said cylinder, means for recording an information signal on said magnetic tape as a group of non-continuous recording tracks, means for feeding the magnetic tape at a speed different from the recording speed at the time of reproduction, means for supplying said electro-mechanical converter element with a preset voltage corresponding to the amount of displacement between the recording track and the scanning magnetic head that is caused in accordance with different feed rates, means for producing a weighted average of the center level of the preset voltage for each field over the period at least equal to the cycle in which said center level changes from a maximum to the next maximum, means for changing said center level in order that said weighted average may approach a predetermined value, and means for making compensation so that the average DC voltage of said preset voltage is reduced to zero.

2. A magnetic recording and reproducing apparatus with a movable head according to claim 1, in which said means for producing a weighted average extracts the maximum and minimum values of the center voltage and uses the average of the maximum and minimum values as a weighted average.

3. A magnetic recording and reproducing apparatus with a movable head according to claim 1, in which the same voltage as at the end of scanning the recording track is kept applied for a predetermined time length after the rotary magnetic head leaves the magnetic tape, the same voltage as at the start of scanning is kept applied for a predetermined time length before the rotary magnetic head comes into contact with the magnetic tape, and the switching point between the voltages for the end and start of scanning is set in such a manner that the average DC component of the voltage applied to the electro-mechanical converter element is reduced to zero.

4. A magnetic recording and reproducing apparatus with a movable head, comprising an electro-mechanical converter element, a rotary magnetic head mounted on said electro-mechanical converter element, a cylinder including the rotary magnetic head, a magnetic tape wound diagonally on said cylinder, means for recording an information signal on said magnetic tape as a group of non-continuous recording tracks, means for feeding the magnetic tape at a speed different from the recording speed at the time of reproduction, means for supplying said electro-mechanical converter element with a preset voltage corresponding to the amount of displacement between the recording track and the scanning magnetic head that is caused in accordance with different feed rates, means for producing a weighted average of the center level of the preset voltage for each field over the period at least equal to the cycle in which said center level changes from a maximum, means for changing said center level in order that said weighted average may approach a predetermined value, and means for modifying the preset voltage so that the average d.c. voltage of said preset voltage is reduced to zero, wherein during the second half of the period when the reproduction head does not scan the recording track, said electro-mechanical converter element is driven by a drive waveform at the time of start of the next scanning, and during the first half of said period, said electro-mechanical converter element is driven by the sum of the applied voltage value of the electro-mechanical converter element at the end of the present head scanning and a value DC given by the equation below $$DC = -2[T_f/(T_f - T_s)]V_n$$

wherein $T_f$ is the scanning period of each head, $T_s$ the time required for scanning a single recording track, and $V_n$ the average value of drive voltage of the electro-mechanical converter element for the present scanning of the track.

5. A method of magnetic recording and reproducing with an electro-mechanical converter element, a rotary magnetic head mounted on the electro-mechanical converter element, a cylinder including the rotary magnetic head and a magnetic tape wound diagonally on the cylinder, the method comprising the steps of:

recording an information signal on the magnetic tape as a group of non-continuous recording tracks;

feeding the magnetic tape at a speed different from the recording speed at the time of reproduction;

supplying the electro-mechanical converter element with a preset voltage corresponding to the amount of displacement between the recording track and the scanning magnetic head that is caused in accordance with different feed rates, producing a weighted average of the center level of the preset voltage for each field over a period at least equal to the cycle in which the center level changes from a maximum to the next maximum, changing the center level in order that the weighted average may approach a predetermined value, and modifying the preset voltage so that the average d.c. voltage of the preset voltage is reduced to zero.

6. A method as in claim 5, in which the step of producing a weighted average includes the steps of extracting the maximum and minimum values of the center voltage and using the average of the maximum and minimum values as a weighted average.

7. A method as in claim 5, in which the same voltage as at the end of scanning the recording track is kept applied for a predetermined time length after the rotary magnetic head leaves the magnetic tape, the same voltage as at the start of scanning is kept applied for a predetermined length before the rotary magnetic head comes into contact with the magnetic tape, and the switching point between the voltages for the end and start of scanning is set in such a manner that the average d.c. component of the voltage applied to the electro-mechanical converter element is reduces to zero.

8. A method as in claim 5, in which during the second half of the period when the reproduction head does not scan the recording track, the electro-mechanical converter element is driven by a waveform at the time of start of the next scanning, and during the first half of the period, the electro-mechanical converter element is driven by the sum of the applied voltage value of the electro-mechanical converter element at the end of the present head scanning and a value DC given by the equation below $$DC = -2[T_f/(T_f-T_s)]Vn$$

wherein $T_f$ is the scanning period of each head, $T_s$ is the time required for scanning a single recording track, and Vn is an average value of drive voltage of the electro-mechanical converter element for the present scanning of the track.

9. A method of driving an electro-mechanical converter element comprising the steps of:

diagonally winding a magnetic tape on a cylinder having a scanning rotary magnetic head mounted on the electro-mechanical converter element;

recording an information signal on the magnetic tape as a group of non-continuous recording tracks;

feeding the magnetic tape at a speed different from the recording speed at the time of reproduction; and applying to the electro-mechanical converter element a preset voltage corresponding to the amount of displacement between the recording track and the scanning magnetic head which is produced in accordance with the different feed speeds, a waveform of the preset voltage being formed to reduce an average d.c. voltage to zero during the period when the rotary magnetic head rotates one rotation, and a center voltage of the preset voltage being additionally average during the period when the rotary magnetic head is contacted with the magnetic tape, and the present voltage having the center voltage which is changed to allow the additionally averaged voltage to approach a predetermined value being applied to the electro-mechanical converter element.

10. A method according to claim 9, in which a maximum value and a minimum value are extracted from the center voltage and an average value of the maximum value and the minimum value is used as an additionally average value.

11. A method according to claim 9, in which the preset voltage is applied to the electro-mechanical converter element when a start portion and an end portion of the recording track are scanned, the voltage at the scanning of the end portion is maintained for a predetermined time interval after the rotary magnetic head is separated from the magnetic tape, the voltage at the scanning of the start portion is maintained for a predetermined time interval before the rotary magnetic head is contacted with the magnetic tape, and the switching time between the voltage at the scanning of the end portion and the voltage at the scanning of the start portion is set to reduce to zero the average d.c. value of the voltage applied to the electro-mechanical converter element.

12. A method according to claim 9, in which during a latter half of the period when the reproduction head does not scan the recording track, the electro-mechanical converter element is driven by a value of the drive waveform of a next scanning at the time of start of track scanning, and during a former half of the period, the electro-mechanical converter element is driven by a value obtained by adding to the applied voltage of the electro-mechanical converter element at the end of the present head scanning, a value DC given by a following equation $$DC = -2[T_f/(T_f-T_s)]Vn$$

wherein $T_f$ is a scanning period of each head, $T_s$ is a time required for scanning a single recording track, and Vn is an average drive value of the electro-mechanical converter element at the scanning of the track.

* * * * *